A. SPEIRS.
COOKING UTENSIL.
APPLICATION FILED APR. 1, 1907.

942,111.

Patented Dec. 7, 1909.

Witnesses:
Eleanor W. Dennis.
Edith M. Hinckley.

Inventor:
Alexander Speirs
by S. W. Bates

UNITED STATES PATENT OFFICE.

ALEXANDER SPEIRS, OF WESTBROOK, MAINE.

COOKING UTENSIL.

942,111.  Specification of Letters Patent.  Patented Dec. 7, 1909.

Application filed April 1, 1907. Serial No. 365,656.

*To all whom it may concern:*

Be it known that I, ALEXANDER SPEIRS, a citizen of the United States of America, and resident of Westbrook, county of Cumberland, State of Maine, have invented certain new and useful Improvements in Cooking Utensils, of which the following is a specification.

My invention relates to a cooking utensil adapted to be used particularly for cooking baked beans and other like articles of food which require slow cooking and where the slow penetration of the heat from the outside to the inside of the dish is favorable to cooking the above articles of food.

The class of utensils to which my invention particularly relates, comprises an open topped dish with a tight fitting cover, both the dish and the cover being formed of a double thickness of sheet metal with an insulating space between the outer and inner shell, this insulating space being filled with asbestos. I have found from experience in manufacturing these dishes that there were numerous practical difficulties which I encountered and it is to the remedying of these difficulties and for the purpose of making the dishes cheaply and substantially, that my present invention is designed as will be hereinafter pointed out.

I illustrate my invention in the accompanying drawing in which—

Figure 1:
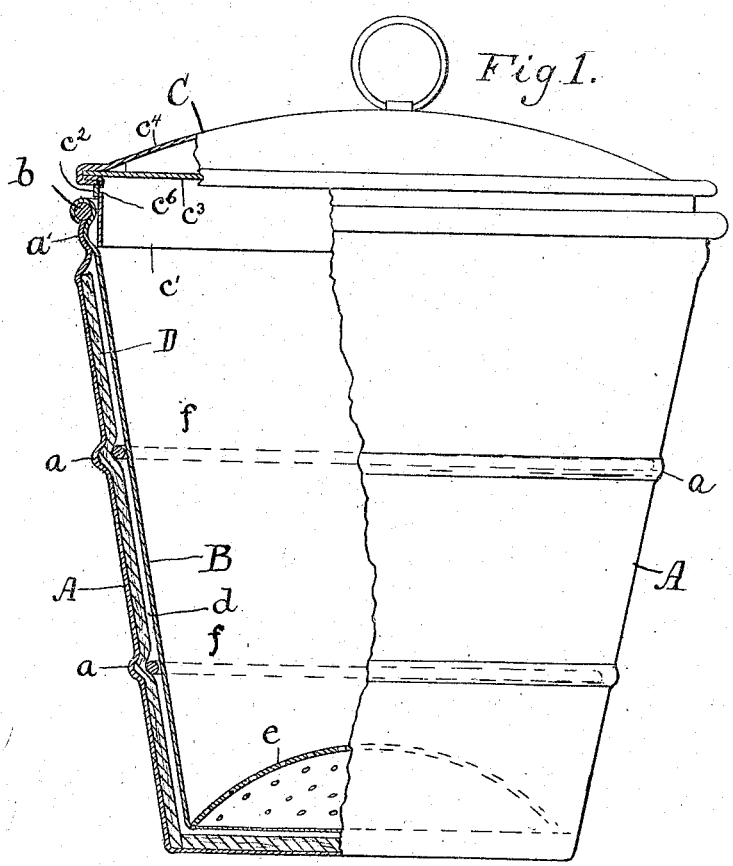
Figure 4:
Figures 2, 3:
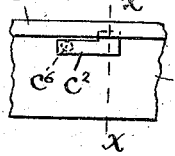

Figure 1 is a part side elevation and part vertical section through a utensil constructed according to my invention, Fig. 2 is a detail view of the flange of the cover to show the vent, Fig. 3 is a section on $x\ x$ of Fig. 2 and Fig. 4 is a detail of the relief valve plate.

The body of the utensil is made up of a pair of open topped sheet metal vessels A and B preferably flaring upward or smaller at the bottom than at the top. They are separated throughout the greater part of their extent by an insulating space in which is placed a sheet D of asbestos extending around the sides and across the bottom. A tight fitting cover C closes the upper end of the utensil.

One of the difficulties experienced has been to secure the inner and outer vessels together in a practical and neat manner so that they would make a tight joint with each other thus preventing water from getting between the two vessels. In order to securely lock the two vessels together, I finish the upper edge of the inner vessel B by inserting a wire $b$ in the usual manner of finishing such edges, slipping over it the outer vessel A whose upper edge is unfinished and drawn inward so as to fit closely on the inner vessel just below the upper edge and immediately below the wire $b$. A beading or grooving machine is now used to form an annular groove or bead $a'$ just below the upper edges where the two vessels come in contact, it being understood that the bodies of the vessels are slightly separated to form an insulating space $d$. The effect of forming this groove is to securely lock the two vessels together so that they cannot be separated with a joint which is practically water tight because neither vessel can be moved vertically with relation to the other on account of the fact that both are bent outward and then inward by the action of the beading or grooving machine. Another difficulty experienced was in holding the asbestos sheet D against the sides of the vessels and this I now provide for by forming one or more grooves or beads $a$ in the outer dish and after the sheet of asbestos is laid on and before the inner vessel is inserted, I press a metal ring $f$ into the asbestos opposite each groove forcing the asbestos into the groove and incidentally leaving an air space between the inner vessel and the asbestos sheet.

It is important in these dishes to have a tight fitting cover although there should be a small vent to prevent the accumulation of dangerous pressure inside. I form my cover of a flat disk $c^3$, an annular rim or flange $c'$ on its lower side, outwardly flanged on its upper edge to fit against the under side of the disk. The rim $c'$ is held to the disk by a convex top plate $c^4$ which turns down over the edge of the disk $c^3$ and the upper flanged edges of the rim.

Instead of forming my joint at the wired edge of the inner vessel as is usual, I form it where the lower plain edge of the rim comes in contact with the flaring inner surface of the inner vessel, the flexible edge of the rim tending to conform to any irregularity in the inner vessel. The rim is made wide enough so that the edge of the cover will come some distance above the wire $b$.

The dish is vented by means of a vent hole $c^6$ formed in the side of the rim where it comes above the edge of the inner vessel and this vent hole is closed by a spring plate $c^2$ which covers its outside, acting as a relief valve when the pressure becomes excessive. The plate $c^2$ is shown as L-shaped with a flange $c^5$ which shuts in between the edge of the plate $c^4$ and the flange of the rim $c^7$ and is thus held without rivets.

In using this utensil for baking beans the practice has been to cover the beans with an excess of water putting in enough water so that the excess would just about boil away during the time of cooking, leaving the beans with just enough moisture but not too much. By this method an ebullition took place continually in the beans tending to break them up into pieces which was not desirable. To remedy this difficulty, I form a false bottom in the bottom of the dish perforated so as to admit water but exclude the beans or other articles being cooked and forming a water chamber next to the bottom in which the excess of water is retained. As here shown, I place on the bottom of the dish a convex perforated diaphragm $e$ which may be easily removed for the purpose of cleaning, etc. By this construction I retain the surplus water at the bottom of the mass of beans and as it boils away the steam passes up through the beans cooking them thoroughly without breaking them. When the surplus moisture is all boiled out the beans will have been cooked without being broken. It is evident that this diaphragm and chamber may be otherwise formed than as here shown and that variations may be made in other features shown without departing from the spirit of my invention.

I claim:—

The herein described cooking utensil consisting of a pair of open topped sheet metal vessels forming an inner and an outer vessel said vessels being secured together to leave a substantially steam tight insulating space between them, an annular groove formed in the outer vessel, a sheet of insulating material occupying and partially filling said space and in contact with the outer vessel and a tightly fitting ring pressing the asbestos outward into said groove.

Signed by me at Portland, this 18th day of March A. D., 1907.

ALEXANDER SPEIRS.

Witnesses:
S. W. BATES,
ELEANOR W. DENNIS.